United States Patent [19]

Schwarz

[11] Patent Number: 4,637,089
[45] Date of Patent: Jan. 20, 1987

[54] DEVICE FOR CLEANING LIGHT WAVEGUIDE PLUG CONNECTOR PARTS

[75] Inventor: Johann Schwarz, Munich, Fed. Rep. of Germany

[73] Assignee: Siemens Aktiengesellschaft, Berlin and Munich, Fed. Rep. of Germany

[21] Appl. No.: 751,021

[22] Filed: Jul. 2, 1985

[30] Foreign Application Priority Data

Aug. 3, 1984 [DE] Fed. Rep. of Germany ... 8423218[U]

[51] Int. Cl.$^4$ ............................................. B08B 11/00
[52] U.S. Cl. ................................. 15/118; 15/210 R; 15/235
[58] Field of Search ............ 15/118, 210 R, 235; 401/11, 23, 28, 198

[56] References Cited

U.S. PATENT DOCUMENTS

| | | | |
|---|---|---|---|
| 1,703,603 | 2/1929 | Stuart | 15/118 X |
| 2,227,710 | 1/1941 | Finn | 15/118 |
| 2,481,803 | 9/1949 | Weaver | 15/118 X |
| 2,549,227 | 4/1951 | Ostrander | 15/118 X |
| 4,207,644 | 6/1980 | Westran | 15/210 R |

FOREIGN PATENT DOCUMENTS 3146080 6/1983 Fed. Rep. of Germany .
741230 12/1932 France ......................... 15/210 R Primary Examiner—Chris K. Moore
Attorney, Agent, or Firm—Hill, Van Santen, Steadman & Simpson

[57] ABSTRACT

A rod-shaped member comprises a respective cleaning wick projecting from the member at each of its two ends, the cleaning wicks extending out of a pin-shaped member end at the one end and being guided in a hollow-cylindrically shaped member end at the other and being bent around a free edge of the latter member end. While crushing the projecting wick, the one end can be introduced into socket-shaped LWG plug connector parts and therefore serves for cleaning LWG end faces ending in depressions, whereby, given suitable dimensioning, a pin-shaped LWG plug connector part can be inserted into the hollow-cylindrically fashioned member end and can be turned therein. Thus, a light waveguide end face at the free end of the plug connector part can be cleaned together with and at the same time as the outside surface of the pin-shaped plug connector part with the same tool.

10 Claims, 3 Drawing Figures

DEVICE FOR CLEANING LIGHT WAVEGUIDE PLUG CONNECTOR PARTS

BACKGROUND OF THE INVENTION

1. Field of the Invention

The invention relates to a device for cleaning light waveguide plug connector parts wherein, at an end of a rod-shaped member, a wick of optical-fiber-compatible material seated in a cavity of the member and guided in a pin-shaped section of the member has a free end conducted such out of the member so that the free end of the wick projecting from the member can be crushed to form a cleaning stopple.

2. Description of the Prior Art

A device for cleaning light waveguide (LWG) socket plugs is disclosed by the German OS No. 31 46 080. This known device can be advantageously used in order to clean LWG end faces lying in depressions, particularly LWG plug connector parts which end in a socket. By designing a suitable dimensioning of the member end from which the wick projects, this member end, together with the wick which is thereby crushed, can be introduced into the depression formed, for example, by a bushing and can be turned by a twirling rotary motion under slight axial pressure such that the crushed wick end slides across the LWG end face situated in the floor of the depression and thereby rids this end of dust and/or dirt particles. When the wick end is dirty, it can be withdrawn further from the member by pulling on the wick and can be cut off to an appropriate length, whereby a new, clean wick end is available.

The known device, however, is not suitable without further ado for cleaning, for example, LWG end faces that are situated at the free end of a pin-shaped plug connector part.

SUMMARY OF THE INVENTION

It is therefore an object of the present invention to improve a device for cleaning light waveguide connector plugs, such that it can be used to clean LWG socket plugs and is also suited without complications for cleaning LWG end faces at a pin-shaped connector part.

This object is inventively achieved in that the member in addition to a construction at one end similar to that described in German OS No. 31 46 080, comprises a freely ending hollow-cylindrical region at its other end and in that a second wick carried in the member penetrates this hollow-cylindrical region with play and has its free end bent or wrapped around a free edge of the hollow cylindrical region.

Upon designing a suitable dimensioning of the hollow-cylindrical region of the rod-shaped member, enough room remains free between the wick section conducted through this region and the wall of the hollow-cylindrical region so that a pin-shaped end of a light waveguide plug connector can be introduced between wick and wall of the hollow-cylindrical region. When the pin-shaped plug connector part is turned in the hollow-cylindrical region, then the wick slides across the outside face of the pin-shaped plug connector part and frees this of deposited dust particles and/or deposited layers of dirt. Simultaneously, the LWG end face situated at the free end of the pin-shaped connector part is also thereby cleaned.

The cleaning of an LWG end face at the free end of a pin-shaped plug connector part is further improved when the hollow-cylindrical region is limited by a floor proceeding at right angles relative to the axis of the rod-shaped member and the wick is conducted through a central opening of the floor in the hollow-cylindrical region.

In a further development of the invention, the rod-shaped member is provided with caps latchable to the member at both of its ends, these caps covering the exposed wick ends. Further, a retaining clip can be provided on the rod-shaped member. The exposed wick ends are protected against an undesirable contamination in this fashion and it is thereby effected that the device can be taken along in the pocket of an article of clothing in an uncomplicated fashion like a fountain pen or a mechanical pencil.

BRIEF DESCRIPTION OF THE DRAWINGS

An exemplary embodiment of the invention shall be explained in greater detail below with reference to three figures.

Thereby shown enlarged, partially in section, are.

DESCRIPTION OF THE PREFERRED EMBODIMENTS

Figure 1:
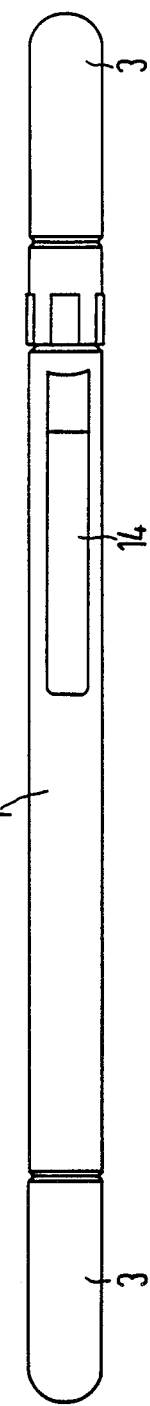
FIG. 1 is a side elevational view of the device with caps in place at both ends.
Figure 2:
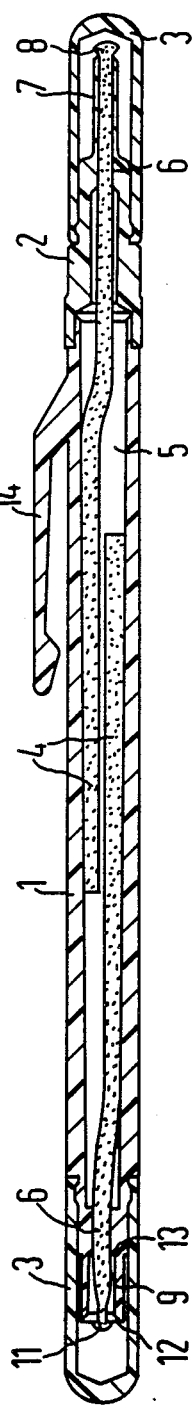
FIG. 2 is a longitudinal section through the device.

As shown in the FIGS., a rod-shaped member 1 has a cylindrical outside contour comprising an inside cavity 5 in which two wicks 4 are carried. One of the two wicks 4 is conducted out of the member 1 at each end through an opening 6 through which a wick 4 can only be drawn when overcoming a certain frictional resistance. The wicks 4 may be made of a leather material formed into strips.

At one end of the member 1, the wick 4 is surrounded by a sleeve-shaped end 7 of the member 1 or of a projection 2 that can be screwed to the member. The sleeve 7 projects somewhat from the projection 2. As a result thereof, as known, the projecting wick end 8 at this end of the device can be introduced into, for example, the depression formed by a bush-like plug connector part at whose floor an LWG end face is situated.

Figure 3:
FIG. 3 is a perspective view of the interaction of a pin-shaped plug connector part with that a hollow-cylindrical region of the rod-shaped member which is shown partially removed for a better illustration of the position of the cleaning wick.

At the other end of the member 1, the member has a hollow-cylindrical region 9 at that side of the opening 6 facing away from the cavity 5. The wick 4 is loosely carried in the hollow-cylindrical region 9, so that, as particularly shown in FIG. 3, a pin-shaped end 10 of an LWG plug connector part can be introduced into the space enclosed by the hollow-cylindrical region 9 in addition to the wick 4. In order to prevent a slideback of the wick 4 into the cavity 5, the wick 4 has its free end 11 bent around a free edge of the hollow-cylindrical region 9. Since the opening 6 is provided concentric to the hollow-cylindrical region, the wick 4 is caused to be pressed against a floor 13 surrounding the opening 6, being pressed thereagainst at the side of the hollow-cylindrical region 9. As a consequence, this wick section is applied to an LWG end face which ends in the pin-shaped part 10 and cleans the latter of dirt that may be adhering thereto.

Dirty parts of the wick can be easily removed by withdrawing a wick section from the member 1 and subsequently cutting off the dirty wick parts. Caps 3 which secure the cleaning parts of the member 1 against contamination can be snapped to the member 1 or to the projection 2 at both ends of the member 1. Further, a retaining clip 14 may be attached to the member 1 which enables the device to be clipped to the edge of a shirt pocket in the manner of a fountain pen or mechanical pencil.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. A device for cleaning light waveguide plug connector parts wherein, at an end of a rod-shaped member, a wick of optical-fiber-compatible material seated in a cavity of said member and guided in a pin-shaped section of said member has a free end conducted out of said member such that said free end of said wick projecting from said member can be crushed to form a cleaning stopple, said member comprising a hollow-cylindrical region at its other end; and having a further wick seated in said member loosely penetrating said hollow-cylindrical region and having its free end bent around a free edge of said hollow-cylindrical region.

2. A device according to claim 1, wherein said hollow-cylindrical region is limited by a floor proceeding at right angles relative to the axis of said rod-shaped member; and said further wick is conducted into said hollow-cylindrical region through a central opening of said floor.

3. A device according to claim 1, wherein said rod-shaped member comprises caps latchable to said member at both ends thereof, said caps covering the exposed wick ends.

4. A device according to claim 1, wherein a retaining clip is attached to said rod-shaped member.

5. A device for cleaning light waveguide end faces comprising:
   a hollow cylindrical member;
   a first end of said member having a cylindrical axial projection with an opening therethrough communicating with the interior of said cylindrical member;
   a second end of said member having a hollow cylindrical projection with a floor perpendicular to said member axis and with a central opening in said floor communicating with said interior;
   a first wick carried in said member projecting through said opening in said first end for cleaning end faces of light waveguides in depressed areas; and
   a second wick carried in said member projecting through said opening in said floor and extending through said cylindrical projection and being bent around a free end of said projection for cleaning pin shaped end faces of light waveguides.

6. A device according to claim 5, including caps removably securable to said cylindrical member at each of said ends.

7. A device according to claim 5, including a retaining clip attached to said cylindrical member.

8. In a device for cleaning light waveguides having a hollow cylindrical housing carrying a wick which projects through an opening in one end of said housing the improvement comprising:
   a second end of said housing having a hollow cylindrical projection;
   a second wick carried in said housing and extending through said projection such that a free end of said wick can be bent around a free end of said projection;
whereby pin shaped end faces of light waveguides can be cleaned by insertion of said end faces into said cylindrical projection and rotation of said end faces against said second wick.

9. A device according to claim 8, including caps removably securable to said housing at each of said ends.

10. A device according to claim 8, including a retaining clip attached to said cylindrical member.

* * * * *